United States Patent
Chizi et al.

(10) Patent No.: US 9,420,427 B2
(45) Date of Patent: Aug. 16, 2016

(54) METHOD AND SYSTEM FOR TRACKING THE WHEREABOUTS OF PEOPLE IN URBAN SETTINGS

(71) Applicant: DEUTSCHE TELEKOM AG, Bonn (DE)

(72) Inventors: Barak Chizi, Ashkelon (IL); Dudu Mimran, Tel Aviv (IL); Yuval Elovici, Arugot (IL); Alex Binon, Beer Sheva (IL)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 14/551,112

(22) Filed: Nov. 24, 2014

(65) Prior Publication Data

US 2015/0163638 A1 Jun. 11, 2015

(30) Foreign Application Priority Data

Dec. 5, 2013 (IL) .......................... 229814

(51) Int. Cl.
- *H04W 4/02* (2009.01)
- *H04W 64/00* (2009.01)
- *G01C 21/30* (2006.01)

(52) U.S. Cl.
CPC ............... *H04W 4/028* (2013.01); *G01C 21/30* (2013.01); *H04W 64/00* (2013.01); *H04W 64/006* (2013.01)

(58) Field of Classification Search
CPC ....... G01S 5/0252; G01S 5/02; G01S 5/0278; G01S 5/00; G01S 5/0289; G01S 5/0036; G01S 5/0236; G01S 5/0242; G01S 5/22; G01S 11/06; G01S 1/68; G01S 5/0205; H04W 4/02; H04W 4/043; H04W 4/021
See application file for complete search history.

(56) References Cited

U.S. PATENT DOCUMENTS

| | | | | |
|---|---|---|---|---|
| 2010/0070160 | A1* | 3/2010 | Haatainen | G01C 21/32 701/533 |
| 2012/0028650 | A1* | 2/2012 | Cooper | H04W 64/006 455/456.1 |
| 2013/0304363 | A1* | 11/2013 | Dai | H04M 15/58 701/117 |
| 2014/0278028 | A1* | 9/2014 | Nye | G01C 21/3492 701/117 |

OTHER PUBLICATIONS

European Search Report from a counterpart foreign application, 2 pages, mailed on or after Apr. 2, 2015.

* cited by examiner

*Primary Examiner* — Olumide T Ajibade Akonai
*Assistant Examiner* — Martin Chang
(74) *Attorney, Agent, or Firm* — Roach Brown McCarthy & Gruber, P.C.; Kevin D. McCarthy

(57) ABSTRACT

A method for tracking the whereabouts of people, particularly in urban settings, according to which a cell grid is established within a given geographical region and positional data records associated with each of a plurality of mobile devices within the region, are received from a base station. An Estimated Location Indicator (ELI) associated with a data object in each of every cell of the grid traversed by the corresponding user within a given period of time is generated, from the received positional data records and for each corresponding user of the plurality of mobile devices. A shortest predicted path is generated between each of the generated An Estimated Location Indicators.

9 Claims, 5 Drawing Sheets

METHOD AND SYSTEM FOR TRACKING THE WHEREABOUTS OF PEOPLE IN URBAN SETTINGS

FIELD OF THE INVENTION

The present invention relates to the field of monitoring systems. More particularly, the invention relates to a system and method for tracking the whereabouts of people, particularly in urban settings.

BACKGROUND OF THE INVENTION

The ability to continuously track the whereabouts of people can be very useful to security personnel, to those conducting advertisement related marketing studies, and for determining a concentration of pedestrian or vehicle traffic, and can even be life saving, for example following a catastrophic event.

However, a system that provides continuous and quickly reacting tracking services requires expensive tracking and processing equipment, and additionally imposes a large load on its computer resources due to the need of maintaining a database for each person being tracked as a result of the huge amount of information that has to be saved.

It is an object of the present invention to provide a system for continuously tracking the whereabouts of people that is considerably more inexpensive to maintain than one of the prior art.

It is an additional object of the present invention to provide a method for continuously tracking the whereabouts of people that requires considerably less computer resources than one of the prior art.

Other objects and advantages of the invention will become apparent as the description proceeds.

SUMMARY OF THE INVENTION

The present invention provides a method for tracking the whereabouts of people, particularly in urban settings, comprising the steps of establishing a cell grid within a given geographical region; receiving positional data records associated with each of a plurality of mobile devices within said region, from a base station; generating, from said received positional data records and for each corresponding user of said plurality of mobile devices, an estimated location indicator (ELI) associated with a data object in each of every cell of said grid traversed by said corresponding user within a given period of time; and generating a shortest predicted path between each of said generated ELIs.

The present invention is also directed to a system for tracking the whereabouts of people, particularly in urban settings, comprising a plurality of mobile devices, each of which held or accessed by a corresponding user of a mobile data network; a base station for coordinating call and data traffic with respect to said plurality of mobile devices within a given geographical region in which a cell grid has been established and for generating positional data records associated with each of said plurality of mobile devices within said region; and a computing device for receiving said positional data records, for generating, from said received positional data records and for each corresponding user of said plurality of mobile devices, an estimated location indicator (ELI) associated with a data object in each of every cell of said grid traversed by said corresponding user within a given period of time, and for generating a shortest predicted path between each of said generated ELIs.

DETAILED DESCRIPTION OF PREFERRED EMBODIMENTS

The system and method of the present invention provide continuous people tracking capabilities over a mobile data network while reducing the required amount of computer resources by obtaining region related data for a person being monitored at each of different times and then generating a shortest predicted path between the corresponding points. This method has great utility in urban settings at which a person has much freedom in deciding a desired path.

The network over which the mobile devices communicate is described as being a cellular network, but it will be appreciated that the invention is similarly applicable to other networks as well.

Figure 1:
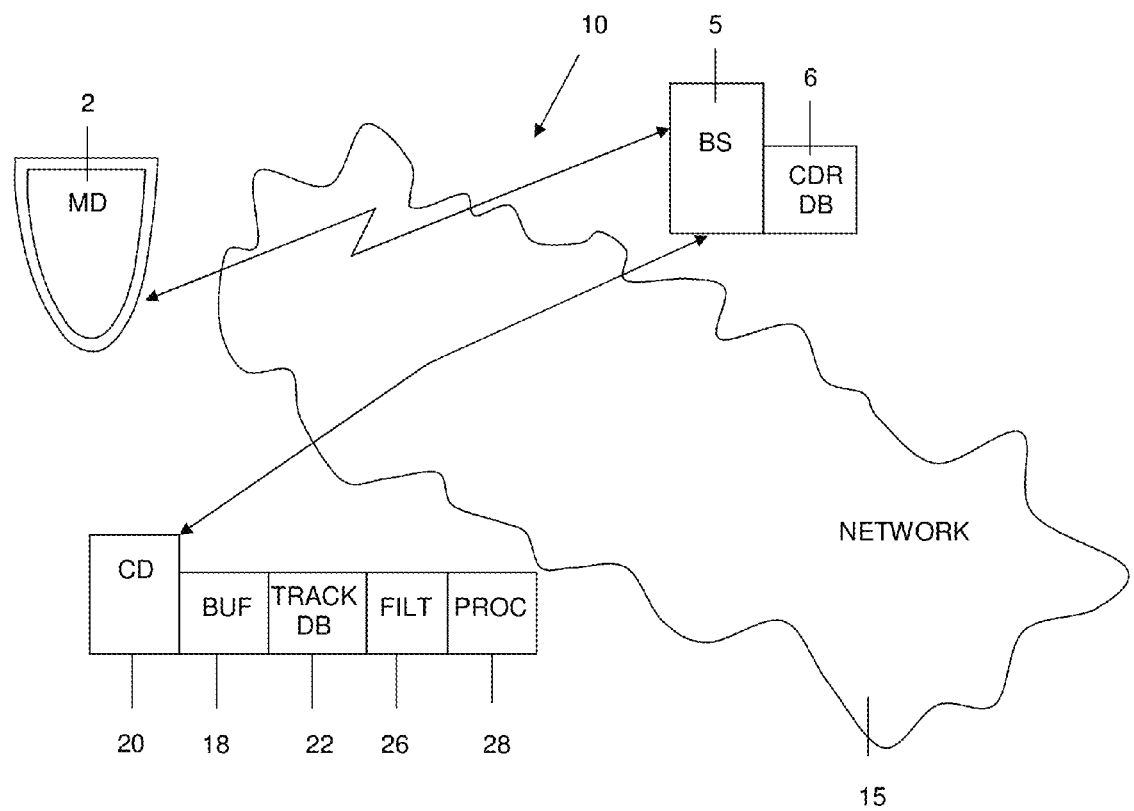
FIG. 1 is a schematic illustration of a tracking system, according to one embodiment of the present invention.

FIG. 1 illustrates tracking system 10, according to one embodiment of the present invention. Tracking system 10 comprises a plurality of mobile devices (MD) 2, each of which is held or accessed by a corresponding user of a mobile data network, and a computing device (CD) 20 used for processing and tracking purposes. Base station (BS) 5 for coordinating call and data traffic through a given cell is able to interface with each of mobile devices 2 and to determine their instantaneous position by triangulation or by means of the GPS module provided with a mobile device. The positional data for all users is stored in Call Data Record (CDR) database 6.

In CDR database 6 is stored user associated data related to each instance of cellular network activity, including calls, text messages, data usage and cell tower registration. The user associated data that is recorded includes the number of the calling party, the number of the called party, the time when the call started, the duration of the call, the phone number charged for the call, an indication of whether the call was answered, the route by which the communication instance entered the exchange, the route by which the communication instance left the exchange, the communication instance type, and the location of the mobile device during the communication instance.

Computing device 20, which may be a server, has a buffer 18, a tracking database 22, a filtering module 26, and a processing module 28. In tracking database 22 is stored a generated user-specific path for all users recorded in the CDR.

Computing device 20 has a working agreement with base station 5 to receive via data network 15 the recently generated data stored in CDR database 6. Due to local security regulations, the user's name for each mobile device cannot be divulged; however, certain user parameters that are of benefit to the tracking system are provided. The received CDR data is temporarily stored in buffer 18 for a sufficient time needed by processing module 28 to process the CDR data and to thereby generate a user-specific path, as will be described hereinafter, until the received CDR data is automatically destroyed, in accordance with security regulations.

In the following description, the user-specific path is described as being generated for individuals advancing within a vehicle, but it will be appreciated that the invention is also applicable to pedestrians.

Each CDR data object may be stored as a tuple in the form of <timestamp, user ID, cell ID>. The cell ID is associated with the physical location and coverage area of the cell, data which is maintained by the cellular service provider. Processing module 28 generates an estimated location indicator (ELI) for each received CDR data object.

Figure 2:
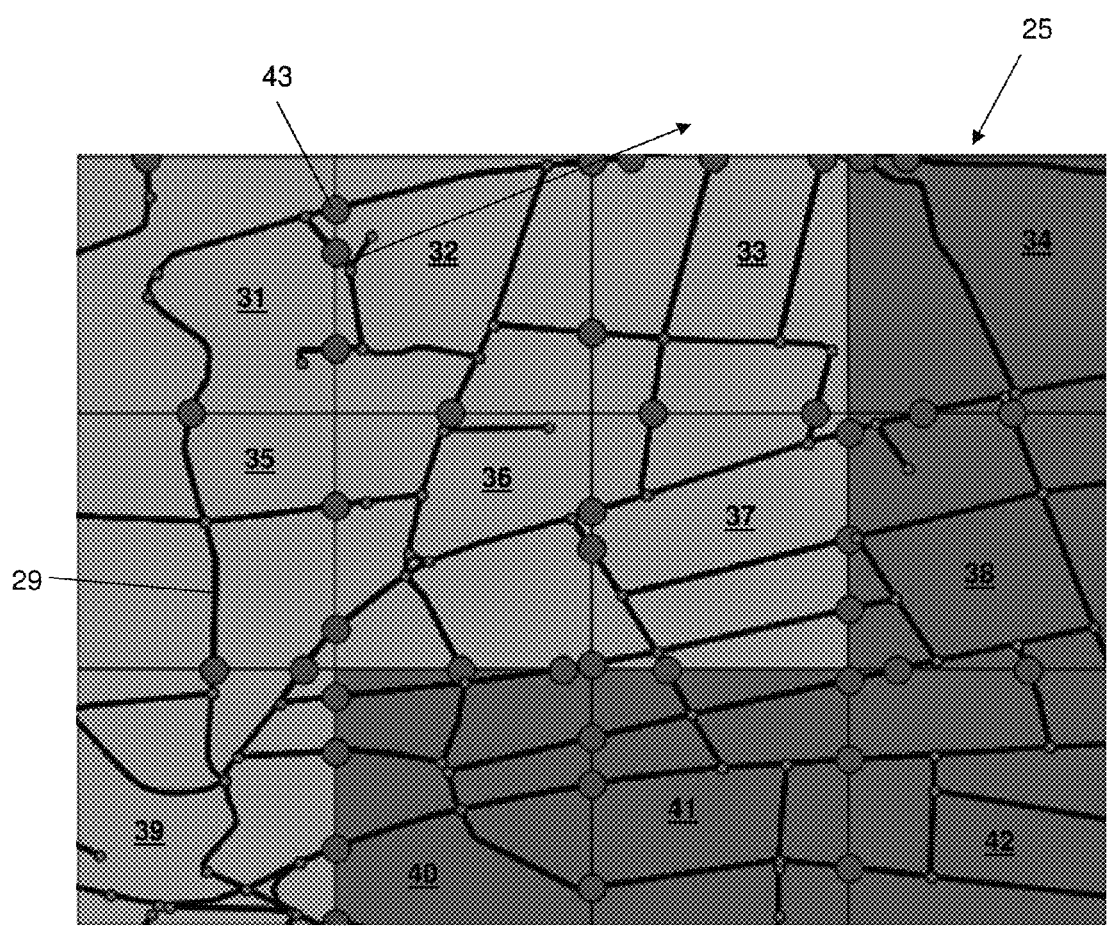
FIG. 2 is a schematic illustration of a cell grid, on which is overlaid a road system and a plurality of transitional points.

In order to appreciate the method of the present invention, reference is now made to FIG. 2, which schematically illustrates a grid 25 of cells 31-42 in an urban area. Each line 29 represents a corresponding road within the urban area which may extend from one cell to another, or alternatively its route may be limited to the physical location of a single cell.

Due to the large number of possibilities for travelling from one location to another, a user-specific path cannot be easily predicted.

Figure 3:
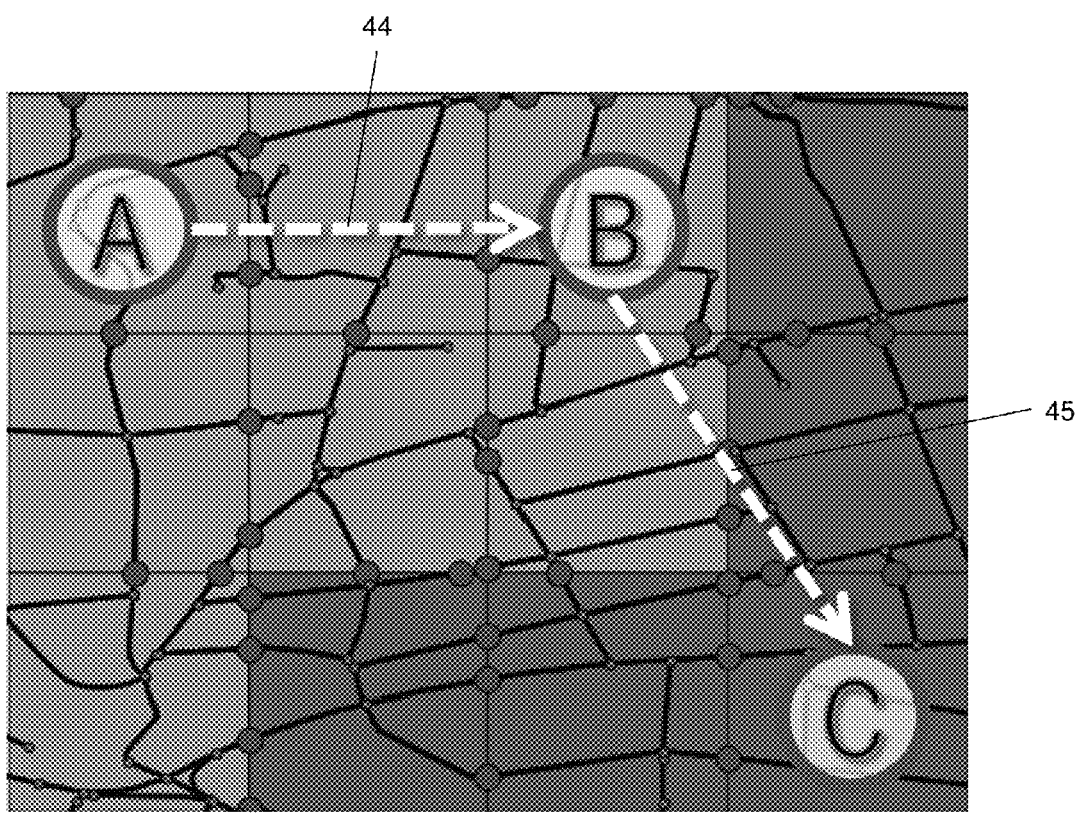
FIG. 3 is a schematic illustration of the cell grid of FIG. 2, showing the generation of a plurality of estimated location indicators and of an estimated path extending therebetween.

As schematically illustrated in FIG. 3, the received CDR data is processed so as to define, for the same user ID, a plurality of ELIs A-C, each of which is associated with a different timestamp and cell ID. For example, ELI A has been assigned to cell [0,0], B to cell [0,2] and C to cell [2,3]. Estimated path 44 is generated from A to B and estimated path 45 is generated from B to C. However, the actual path along which the user traveled may have been considerably different than the estimated path that was generated, often constituting a discrepancy of approximately half a cell width and rendering tracked information to be unreliable.

In addition, various tangible points of interest such as parks, buildings, restaurants, and train stations are generally found in each cell, and may capture the attention of a user or alternatively may cause the user to travel in a direction away from the tangible element. Thus the presence of a point of interest within a cell further adds to the uncertainty as to the path of a user.

In the method of the present invention, the timestamp provided by the CDR data helps to define the elapsed time difference of a trip from one ELI to another. To further reduce the number of possibilities concerning along which route the user travelled, a plurality of transitional points between adjacent cells are predefined, preferably offline, e.g. transitional point 43 shown in FIG. 2. Each of the transitional points, which are located at the intersection of a road and a cell border whereat a large number of vehicles pass when traveling between adjacent cells, constitutes a logical constraint for the processing module to predict the shortest predicted path while passing through a transitional point.

Figure 4:
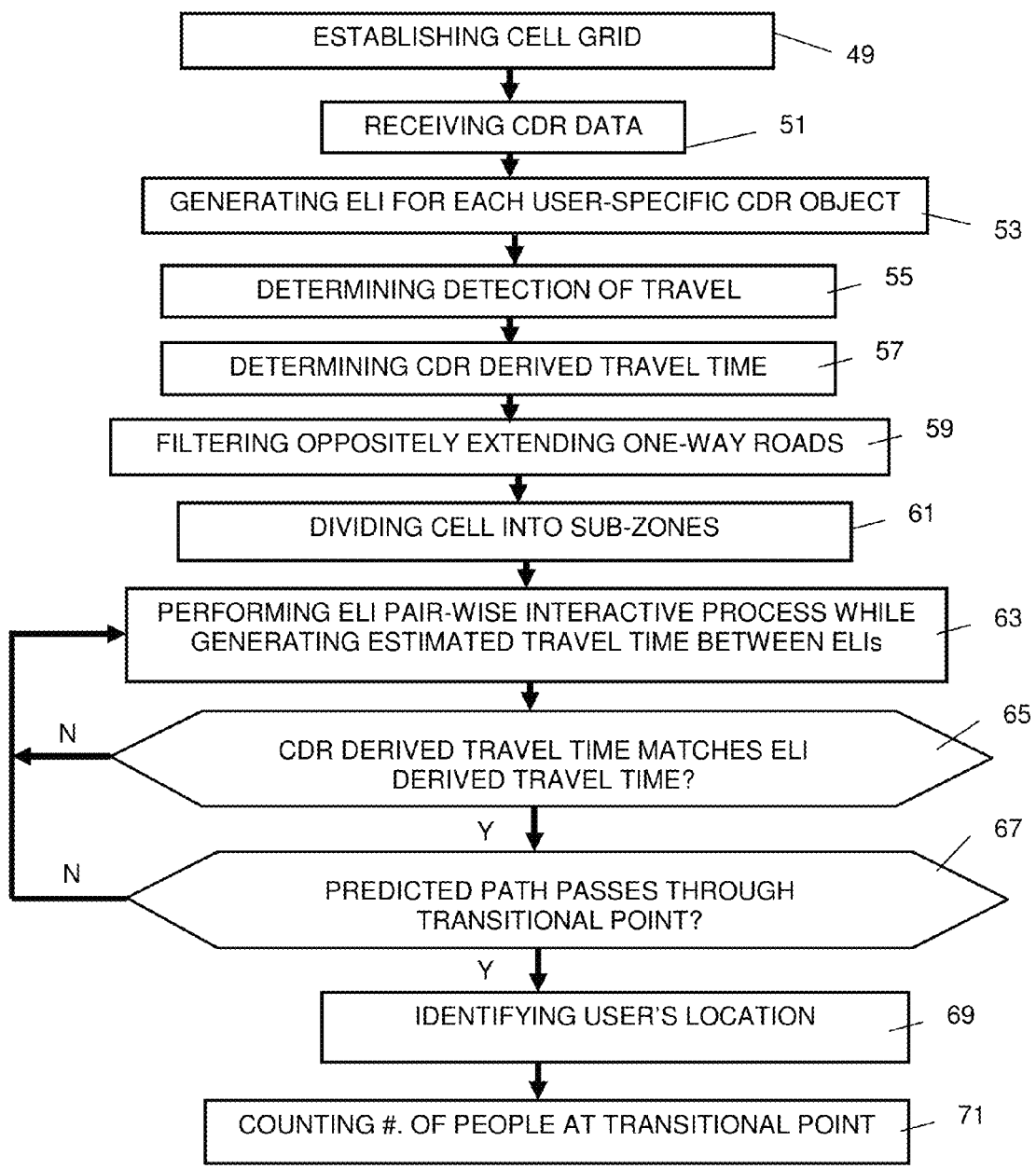
FIG. 4 is a flow diagram of a tracking method, according to one embodiment of the invention.

FIG. 4 illustrates the tracking method, according to one embodiment of the invention. After a cell grid has been established in step 49, including the definition of cell IDs, cell borders, roads passing through the various cells, and transitional points, the CDR data is received in step 51. The processing module extracts data having a common user ID in step 53 and generates an ELI for each corresponding CDR data object, for example in a different cell. By referring to the time stamp of each CDR data object, the direction of travel is determined in step 55 and the time of travel from one cell to another is determined in step 57. The filtering module then filters out in step 59 all one-way roads that extend in an opposite direction than the direction of travel from a first ELI to a second ELI.

Each cell may be divided into a predetermined number of subzones in step 61, for each of which an iteratable ELI is generated. For each cell, the number of iteratable ELIs is generally greater than the number of transitional points. In step 63, the processing module performs an iterative pairwise process whereby one ELI is selected from each cell and from one of the subzones, and the estimated time to travel between the two ELIs is compared with the CDR-derived time of travel. The estimated time of travel is generally dependent on the known number of traffic lights between the two selected ELIs, the average waiting time at each traffic light, and the resulting average travel time. If the estimated time to travel between the two ELIs does not match the CDR-derived time of travel, a different pair of ELIs is examined in step 65, one from each cell and from one of the subzones. After two ELIs are provisionally found between which the estimated time to travel matches the CDR-derived time of travel, the two provisionally selected ELIs are filtered out in step 67 if the predicted path therebetween does not pass through a transitional point. Step 63 is repeated until the predicted path passes through a transitional point, while taking into account various heuristic considerations. Accordingly, the location for the given user at a given time is identified in step 69 as coinciding with the transitional point related to the predicted path, and likewise the number of people at a given time and at the given transitional point is then counted in step 71.

The predicted path may be more accurate when CDR data for three or more different cells is employed, allowing the possibilities for the shortest predicted path between cells to be narrowed by being able to more accurately match the corresponding estimated time to travel with the inter-cell, CDR-derived time of travel.

Figure 5:
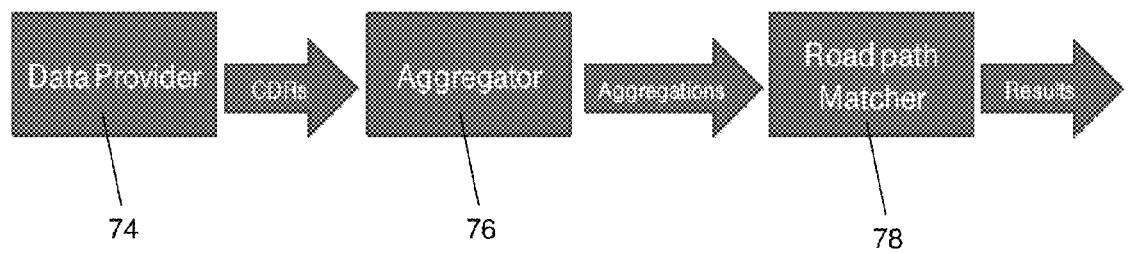
FIG. 5 is a block diagram of an aggregation model which may be implemented for the tracking method of FIGS. 4.

In another embodiment schematically illustrated in FIG. 5, an aggregation model may be implemented for the aforementioned tracking method, in order to reduce computer resources by eliminating the need of having to repeat an iterative process for a large number of people, particularly those located in an urban area or in the vicinity or a public transportation station or traveling along a particular route.

In the aggregation model, data provider 74, e.g. a base station, generates CDR data for each of a large number of people and transmits it to aggregator module 76 of the computing device. Aggregator module 76 relies on data generated by road path matcher 78 associated with the processing module to output the results.

Aggregator module 76 is able to perform the following functions for a given time frame: (1) retrieve a user-specific path, (2) identify all other users that traversed the same path and at the same transitional point, and (3) cluster the identified people into groups according to the duration of the path traversing event.

Figure 6:
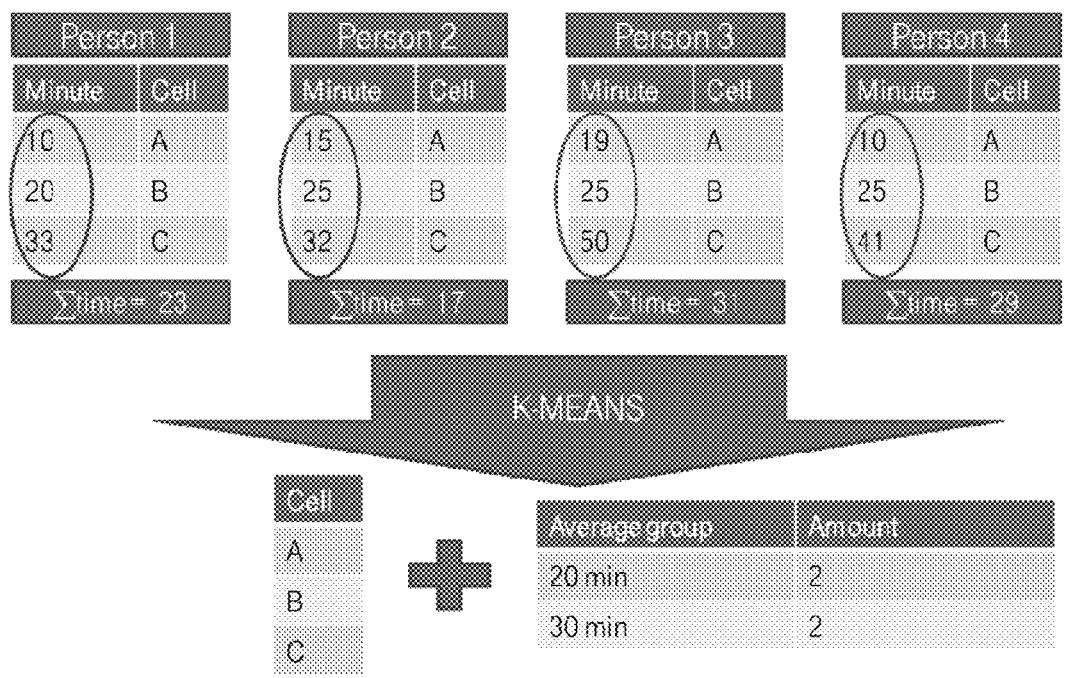
FIG. 6 is an exemplary aggregation operation performed by the aggregation model of FIG. 5.

FIG. 6 illustrates an exemplary aggregation operation performed by the aggregator module. Within a time frame of 1 hour, four people travelled from Cell A to Cell B and then to Cell C, but at different times. Person 1 exited Cell A via a transitional point after 10 minutes, Cell B after 20 minutes, and Cell C after 33 minutes for an average traveling time of 23 minutes. Person 2 exited Cell A after 15 minutes, Cell B after 25 minutes, and Cell C after 32 minutes, for an average traveling time of 17 minutes. Person 3 exited Cell A after 19 minutes, Cell B after 25 minutes, and Cell C after 50 minutes, for an average traveling time of 31 minutes. Person 4 exited Cell A after 10 minutes, Cell B after 25 minutes, and Cell C after 41 minutes, for an average traveling time of 29 minutes.

From the observed data, two mean times are identified: 20 minutes and 30 minutes. The aggregator module then partitions, by K-means clustering, the average traveling time of each person to the cluster with the closest mean time. Any algorithm known to those skilled in the art for clustering is suitable. Thus in this example two people have been aggregated in each of the two average groups.

The mean time of each average group is then matched with a path extending from Cell A to Cell B and then to Cell C which is associated with a corresponding estimated time, for example as described hereinabove with respect to FIG. 4. Calculation time and the amount of needed computer resources are reduced for the path matching phase by aggregating the received data and having to calculate a unique cell path only once for a unique cell path.

It will be appreciated that the aforementioned tracking method is also applicable to tracking pedestrians who traverse known walkways.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for continuously tracking pedestrian or vehicle traffic, particularly in urban settings, while using reduced computer resources, comprising the steps of:
  A) establishing a cell grid within a given geographical region, on which is overlaid a road system;
  B) receiving positional data records associated with each of a plurality of mobile devices within said region, from a base station;
  C) generating, for each of said received positional data records which is associated with a corresponding user of said plurality of mobile devices, a reassignable Estimated Location Indicator (ELI) in each cell of said grid traversed by said corresponding user within a given period of time, wherein each of said ELIs is indicative of an estimated location within a cell in which a given mobile device is located at a given time, yet includes a large number of possibilities of an actual location of said given mobile device within a cell at said given time; and
  D) generating a shortest predicted path between each of said generated ELIs;
  wherein the generated predicted path extends through a transitional point through adjacent cells whereat a predetermined number of vehicles pass when traveling between said adjacent cells, said transitional point being located at an intersection of a road of said road system and a cell border and constituting a logical constraint for predicting the shortest predicted path;
  wherein the predicted path is found by performing the following steps:
  a) dividing each cell of said grid which has been traversed by said corresponding user within said given period of time into a predetermined number of subzones;
  b) generating an iteratable ELI for each of said subzones;
  c) performing the pair-wise iterative process, whereby:
    i) one of said generated iteratable ELIs is selected from each of said cells which has been traversed by said corresponding user within said given period of time;
    ii) comparing an estimated time to travel between a first of said selected iteratable ELIs to a second of said selected iteratable ELIs with an elapsed time difference, as indicated by said received positional data records, from a first cell corresponding to said first selected iteratable ELI to a second cell corresponding to said second selected iteratable ELI; and
    iii) if the estimated time to travel between said first and second selected iteratable ELIs does not match the elapsed time difference from said first cell to said second cell, a different pair of said iteratable ELIs is selected from said first and second cells, respectively, and step ii is repeated;
  d) after a pair of said iteratable ELIs has been provisionally found such that the estimated time to travel there between matches the elapsed time difference from said first cell to said second cell, generating a corresponding predicted path between said provisionally found locations;
  e) filtering out said provisionally found locations if said corresponding predicted path does not extend through a transitional point; and
  f) repeating steps c-e until said corresponding predicted path extends through a transitional point.

2. The method according to claim 1, wherein the shortest predicted path between each of said generated ELIs is found when an estimated time to travel between a first of said ELIs to a second of said ELIs is substantially equal to an elapsed time difference, as indicated by said received positional data records, from a first to last cell of said grid which has been traversed by said corresponding user within said given period of time.

3. The method according to claim 2, wherein the first and second generated ELIs are located in different cells of said grid.

4. The method according to claim 2, wherein the estimated time to travel between the first and second ELIs is dependent on a known number of traffic lights there between, an average waiting time at each of said traffic lights, and a resulting average travel time.

5. The method according to claim 1, further comprising the steps of determining a direction of travel and filtering out all one-way roads extending in an opposite direction to said determined direction of travel, prior to the step of generating a shortest predicted path.

6. The method according to claim 1, wherein the predicted path is found by performing a pair-wise iterative process while generating an estimated travel time between the ELIs.

7. The method according to claim 1, further comprising the steps of identifying all users that traversed said generated predicted path at a same transitional point within said period of time, and clustering said identified users into groups according to a duration of a path traversing event.

8. A system for continuously tracking pedestrian or vehicle traffic, particularly in urban settings, while using reduced computer resources, comprising:
  A) a plurality of mobile devices, each of which held or accessed by a corresponding user of a mobile data network;
  B) a base station for coordinating call and data traffic with respect to said plurality of mobile devices within a given geographical region in which a cell grid overlaid with a road system has been established and for generating positional data records associated with each of said plurality of mobile devices within said region; and
  C) a computing device for receiving said positional data records, for generating, from said received positional data records and for each corresponding user of said plurality of mobile devices, a reassignable estimated location indicator (ELI) in each cell of said grid traversed by said corresponding user within a given period of time, and for generating a shortest predicted path between each of said generated ELIs, wherein each of said ELIs is indicative of an estimated location within a cell in which a given mobile device is located at a given time, yet includes a large number of possibilities of an actual location of said given mobile device within a cell at said given time;

wherein the generated predicted path extends through a transitional point through adjacent cells whereat a predetermined number of vehicles pass when traveling between said adjacent cells, said transitional point being located at an intersection of a road of said road system and a cell border and constituting a logical constraint for predicting the shortest predicted path;

wherein the predicted path is found by performing the following steps:

a) dividing each cell of said grid which has been traversed by said corresponding user within said given period of time into a predetermined number of subzones;

b) generating an iteratable ELI for each of said subzones;

c) performing the pair-wise iterative process, whereby:
  i) one of said generated iteratable ELIs is selected from each of said cells which has been traversed by said corresponding user within said given period of time;
  ii) comparing an estimated time to travel between a first of said selected iteratable ELIs to a second of said selected iteratable ELIs with an elapsed time difference, as indicated by said received positional data records, from a first cell corresponding to said first selected iteratable ELI to a second cell corresponding to said second selected iteratable ELI; and
  iii) if the estimated time to travel between said first and second selected iteratable ELIs does not match the elapsed time difference from said first cell to said second cell, a different pair of said iteratable ELIs is selected from said first and second cells, respectively, and step ii is repeated;

d) after a pair of said iteratable ELIs has been provisionally found such that the estimated time to travel there between matches the elapsed time difference from said first cell to said second cell, generating a corresponding predicted path between said provisionally found locations;

e) filtering out said provisionally found locations if said corresponding predicted path does not extend through a transitional point; and f) repeating steps c-e until said corresponding predicted path extends through a transitional point.

9. The system according to claim 8, wherein the computing device comprises an aggregator module for identifying all users that traversed said generated predicted path at a same transitional point within said period of time and for clustering said identified users into groups according to a duration of a path traversing event, said transitional point being located at an intersection of a road of said road system and a cell border and constituting a logical constraint for predicting the shortest predicted path.

* * * * *